United States Patent [19]
Ellis et al.

[11] 3,792,432
[45] Feb. 12, 1974

[54] SAFETY TRAILER COUPLING
[76] Inventors: Robert Ellis, R.R. No. 5, South-Durham; Clarence Ellis, 7e Rang, Wickham, both of Drummondville, Quebec, Canada
[22] Filed: Mar. 27, 1972
[21] Appl. No.: 238,104

[52] U.S. Cl............... 340/52 R, 280/432, 280/507, 280/511, 340/275
[51] Int. Cl........................... B60d 1/12, B60g 1/00
[58] Field of Search .. 340/52 R, 52 D, 275; 200/52, 200/61.41; 280/432, 446, 504, 507, 508, 511, 509

[56] References Cited
UNITED STATES PATENTS

| | | | |
|---|---|---|---|
| 2,267,969 | 12/1941 | Bennett | 280/511 |
| 3,047,839 | 7/1962 | Brown et al. | 200/61.41 |
| 3,479,057 | 11/1969 | Miller | 340/52 R |
| 3,522,958 | 8/1970 | Lusignan | 280/507 |

Primary Examiner—John W. Caldwell
Assistant Examiner—Joseph E. Nowicki

[57] ABSTRACT

In a trailer hitch assembly having a ball member and a socket member, a safety locking device for preventing the coming out of the socket member from the ball member in case of the accidental loosening of the socket member. The locking device comprises a first element fixed to the attachment plate connecting the ball member to towing vehicle, and a second element fitted to the first element and horizontally displaceable with regard to the first element. The second element is displaced to its locking position by resilient means and retracted to its unlocking position by manual means. Stud means are provided for firmly maintaining, the second element in its displaced positions without the necessity of using a hand. Electrical switch means are removably connected to the second element and are displaceable therewith. They provide the warning of the conductor of the towing vehicle of any defect happening to the hitch assembly.

6 Claims, 7 Drawing Figures

PATENTED FEB 12 1974
3,792,432

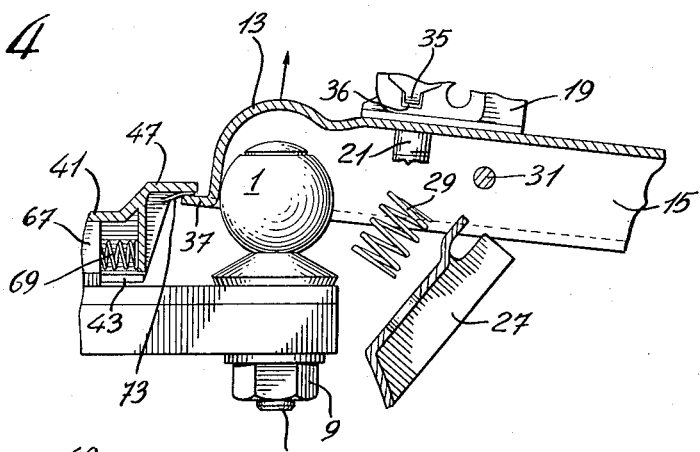
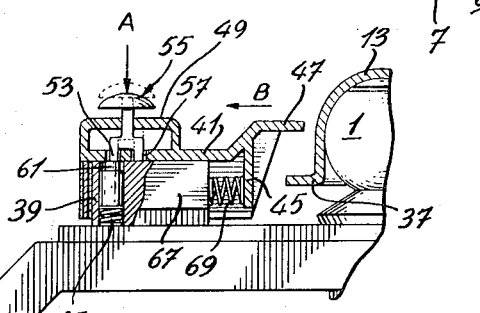
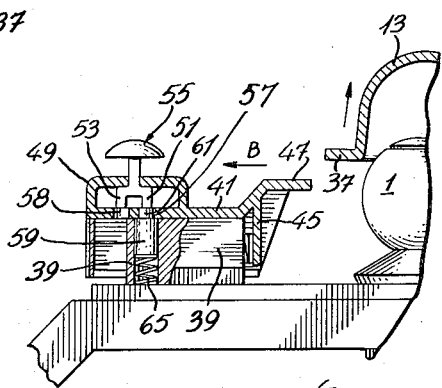
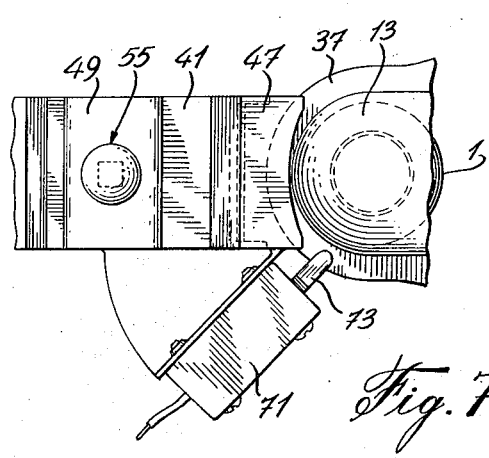

SAFETY TRAILER COUPLING

The invention relates to a safety locking device for a trailer hitch assembly.

More specifically the invention relates to a locking device used with a trailer hitch assembly for providing the safe and secure coupling of a trailer to a towing vehicle.

A trailer hitch assembly briefly stated comprises a ball member attached by means of an attachment plate to the towing vehicle and a socket member attached to the towed vehicle or trailer and fitted to the ball member.

It is known in the art to provide safety locking devices which are used in connection with a trailer hitch assembly. Some of these existing locking devices are made of a single unit formed of a reversed L-shaped arm mounted on a plate that is normally attached to the towing vehicle. The horizontal portion of this L-shaped arm is positioned directly above the ball member of the hitch assembly. When it is desired to perform the coupling of a trailer to or its uncoupling from the towing vehicle, the base of the locking device is loosened (for instance, a screw is untighted) to make the device rotate 90°, in such a way that the horizontal portion thereof be brought out of the way of the ball member on which the socket member is fitted. The socket member is then removed from the ball member. The operation of loosening the base of the L-shaped arm, such as the untightening of the screw to make rotate the locking device, may cause some waste of time or other embarrassment to persons who, for instance, do not have or do not find the necessary tools for the screw tightening and untightening operations.

Others of these existing locking devices are made of two sections, one vertical lower section connected to a bracket which is attached to the towing vehicle, and a upper section, having the shape of a reversed L arm, the vertical part of which is telescopically and resiliently mounted on said lower section, and the horizontal part of which extends over the ball member. A spring is provided between said lower section and said vertical part of said upper section to manually and resiliently make rotate the horizontal part of the upper section from its locking position over the ball member, to a rotated unlocking position of 90° or more in order to provide the coupling and uncoupling operation of the socket member and the ball member. The disadvantage of this kind of locking device is that to make rotate the horizontal part of the device a person must use one of his hands to keep the horizontal part constantly away from the ball member, and this during the whole coupling or uncoupling operation of the socket member and the ball member. Thus, only one hand of the operator is left free to perform the coupling or uncoupling operation. In fact, when the operator removes his hand from the horizontal part of the device, the spring inside the vertical part automatically urges the horizontal part into its locking position above the ball member.

Locking devices of the two types are also provided with electrical switches forming part of a warning device for warning the conductor of the towing vehicle of any defect happening to the trailer hitch assembly. These electrical switches and their component parts are installed inside the locking devices, and when the need arises to make some repairs or other adjustments to these switches, the whole locking devices are to be removed from their fixed places and dismantled, operations which are a waste of time.

The above and other disadvantages are overcome by the present invention which provides a locking device comprising a first element rigidly secured to the plate of a ball member, which plate is connected to the towing vehicle, and a second element displaceably fitted to said first element. The second element is provided with a flange directed towards the flange of a socket member seated in a conventional manner on the ball member. When in locking position, the flange of the second element overhangs the flange of the socket member. The second element is displaced to locking position toward the socket member by resilient means and retracted to its unlocking position by manual means, the resilient and manual means cooperating with stud and plunger means. The stud means maintains the second element in its displaced positions without the necessity of using a hand.

Furthermore, an electrical switch forming part of a warning device may be removably connected to one side of the second element, said switch being displaceable with the second element. The switch is provided with a finger member positioned slightly below the flange of the second element and adjacent thereof. In the locking position, the finger member overhangs, in the same manner as the flange of the second element, the flange of the socket member. It is displaced away from the flange of the socket member at the same time as the flange of the second element. The warning device provides the means for warning the conductor of the towing vehicle of any loosening of the socket member from the ball member. The flange of the second element overhanging the flange of the socket member prevents the latter from coming out of the ball member.

One object of the present invention is therefore to provide a safety locking device for trailer hitch assemblies which is practical and easy to operate.

Another object of the present invention is to provide a combination of a locking and a warning device, which may be easily separated from each other for repairs or the like purposes.

These and other features and characteristics of the invention device will be apparent from the following description having reference to the appended drawings wherein:

FIG. 4 is the same cross-sectional view as in FIG. 3, showing the prevention of the total removal of the socket member from the ball member by means of the flange of the locking device;

FIG. 5 is a partial cross-sectional view along a longitudinal axis of the locking device showing the way the device is displaced away from the socket member;

FIG. 6 is the same view as FIG. 5, showing the locking device displaced to its unlocking position and the socket member freed from the holding of the locking device; and FIG. 7 is a partial top view of the locking device.

Figure 1:
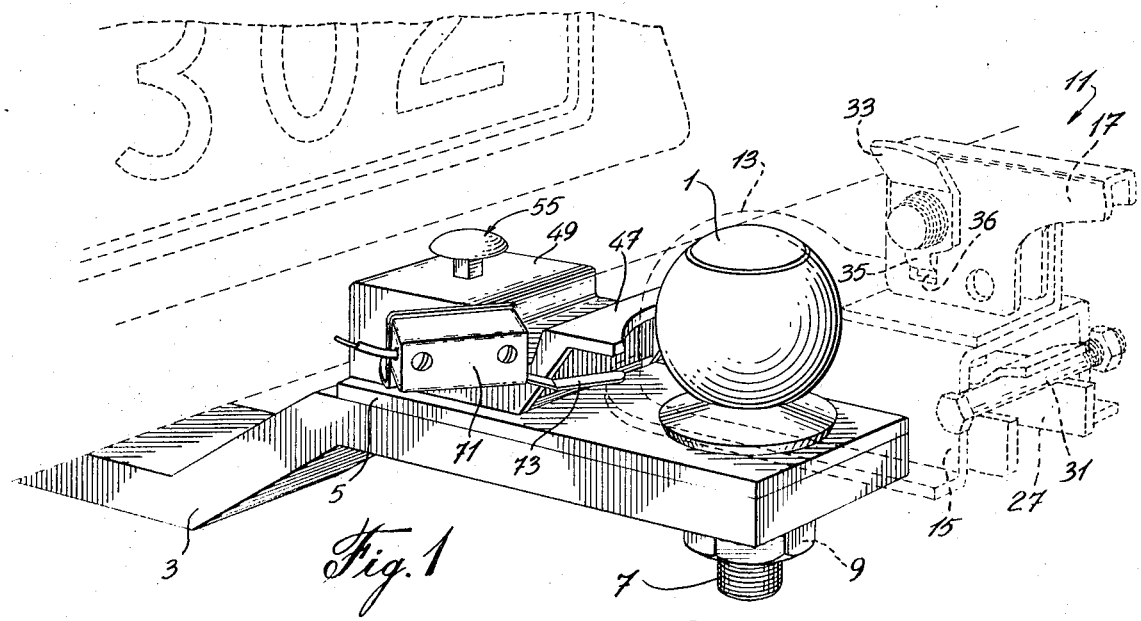
FIG. 1 is a general perspective view of the locking device used in connection with a trailer hitch assembly, and is shown attached to the rear of a towing vehicle.

Now referring to these figures it is shown in FIG. 1 a ball member 1 which is fixed to an attachment plate 3, by means of a bracket 5. The attachment plate 3 is connected at the rear of a towing vehicle. The ball member 1 has a threaded stud 7 and is fastened to the attachment plate 3 and the bracket 5 by means of a nut 9.

A socket member 11 of conventional type, comprising a socket head 13 and a socket body 15 is adapted to be coupled or engaged by means of the socket head 13 to the ball member 1.

A latch or lock mechanism 17 is provided for ensuring the secure coupling and the uncoupling of the socket member to and from the ball member.

The latch mechanism is mounted above the socket body 15 by means of an angle iron 19.

A stud 21 is connected by means of a pivot 23 at its one end to the latch mechanism 17 and its other end is threaded to receive a bolt 25.

A lever arm 27, located inside the socket body, is connected to the threaded part of the stud 21 and is resiliently retained in place by means of the bolt 25. A spring 29 provides the resiliency of the lever arm. The end of the lever arm facing the ball member is bevelled in order to come into contact with the neck of the ball member, and the other end of the lever arm is recessed to receive a pivot 31 crossing the socket body 15.

A small plate 33 resiliently mounted on pivot 23 has a hook element 35 which enters in an aperture 36 provided on the latch mechanism 17. There is also an aperture made on the stud 21 at the level of this hook element (not shown).

The socket member is provided with a peripheral flange 37 as shown in the figures.

Figure 2:
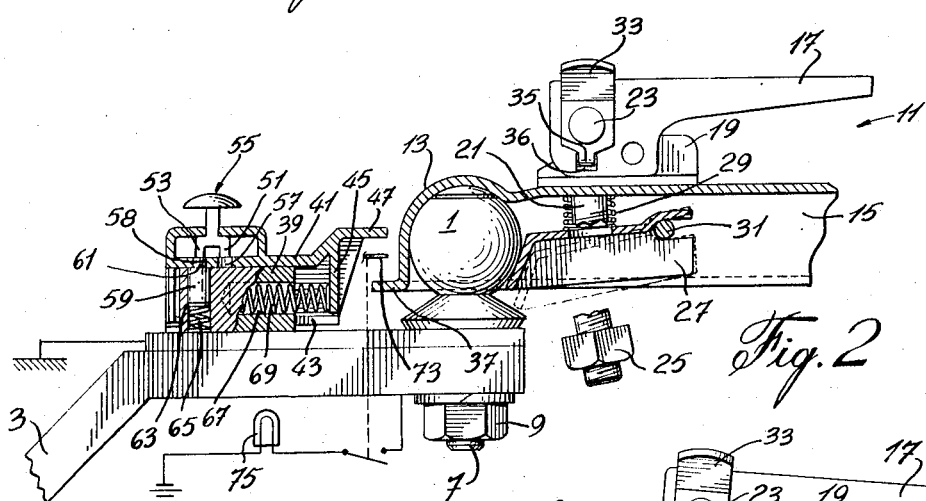
FIG. 2 is a cross-sectional view along a longitudinal axis of the locking device and the socket member, showing the position in which the socket member is, when the securing bolt of the socket member is just broken.
Figure 3:
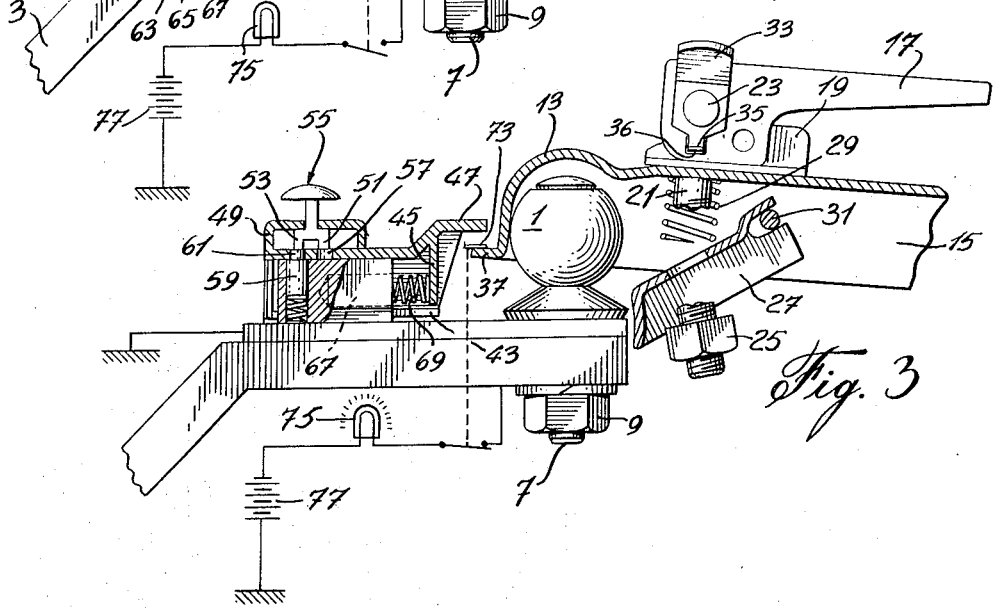
FIG. 3 is the same cross-sectional view as FIG. 2 but showing the position of the socket member coming into contact with the overhanging finger member of the signal switch after that the securing bolt is broken.

In its locking position the latch 17 is horizontally placed as shown in FIGS. 1 to 3. In this position the lever arm 27 is pressed against the ball member thus realizing the firm connection of the socket member and the ball member. To remove the socket member 11 from the ball member 1, the hook element 35 is brought out of the aperture 37, thus permitting to the latch to be pulled upwardly, operation which permits the loosening of the lever arm 27 and therefore allows the separation of the socket member from the ball member. When the latch 17 is pulled upwardly in its non locking position, the hook element is logded (not shown) inside the aperture provided on the stud 21.

All the above mechanism which forms a hitch assembly, is already known in the art and has only been briefly described for a better understanding of the inventive device of the present application.

When bolt 25 is broken, lever arm 27 is loosened and released from its locking position (FIG. 1). It progressively separates from its pivots 31 and finally drops down as shown in FIGS. 3 and 4.

Once the bolt is broken, the socket head 13 has the tendency to come out of the ball member thus causing the separation of the trailer and the towing vehicle.

The locking device of the present invention is made to prevent such separation.

The inventive device is composed of a first element 39, preferably rectangular, rigidly fixed to bracket 5 or integral therewith, and of a second element 41 adapted to be mounted on said first element and be displaceably fitted thereto by any known means, such as lateral undercuts (not shown) and tongue means 43.

The second element 41 is provided with a wall 45 facing the ball member 1, that we will call front wall, and a flange 47 also facing the ball member and the function of which will be explained later.

A cover 49 is disposed on the rear part of the second element 41. The cover forms a space, wherein there are positioned the two prongs 51 and 53 of a reversed U-shaped fork member forming part of a plunger 55. The plunger 55 provides the means for causing the displacement of the second element with respect to the first element as will be explained later.

Corresponding to the two prongs 51 and 53 there are two holes, one forward hole 57 and one rearward hole 58 provided on top of the second element.

A stud 59 provided with a pin head 61 is disposed inside a vertical, preferably cylindrical, cavity 63 of the first element. Stud 59 rests on resilient means, such as a compression coil spring 65, located inside the vertical cavity. The pin head 61 has a diameter slightly smaller than the diameters of the two holes 57 and 58, and is adapted to enter and come out of the holes 57 and 58 under the action of the prongs 51 and 53.

The first element 39 is provided with one central or two lateral horizontal openings 67, in which are disposed resilient means such as compression coil spring 69. One of the ends of the springs 69 abut against the front wall 45 of the second element 41. In the described example there are two lateral openings 67 and two springs 69.

The flange 47 of the second element 41 overhangs the flange 37 of socket head 13 when the locking device is in its locking position, thus preventing the coming out of the socket member from the ball member if any defect happens to the securing bolt 25 and therefore to the lever arm 27 of the socket member 11.

Cover 49 is used as a support for providing the gripping of the second element 41 by hand, and displacing it away from the socket head, in case when the locking device is desired to be brought into its unlocking position. Handle means (not shown) may also be provided on the second element for performing this displacement of the second element 41 with respect to the first element 39.

A switch 71 (FIG. 1) forming part of an electrical warning device is removably connected to the one side of the second element and is displaceable therewith. The switch is provided with a flexible finger member 73 which extends slightly below the flange 47 of the second element and adjacent thereof and overhangs the flange 37 of the socket head 13 in the same way as does the flange 47 of the second element once the device is in its locking position.

Signal means, 75 such as a bell or a lamp, forming part of the warning device is located inside the towing vehicle to draw the attention of the conductor on the defect of the hitch assembly. The warning device is connected to the battery 77 of the towing vehicle.

The mode of operation of the inventive locking device as above described is as follows.

For coupling the trailer to or uncoupling it from the towing vehicle, the locking device is positioned in its unlocking position and is such the flange 47 of the second element and also the finger member 73 of the switch are away from (i.e., do not overhang) the flange 37 of the socket head. This is the position when pin head 61 is inside the forward hole 57 (FIG. 6). The flange 47 is in its retracted non-overhanging position and socket member 11 may be easily removed from or placed onto the ball member 1. In this position of the locking device, the horizontal springs 69 are compressed, but as the pin head 61 is inside the forward hole 57 (FIG. 6) it retains the second element 41 in its retracted position, without the necessity of using a hand to maintain the locking device in this position.

When the locking of the hitch assembly is desired, plunger 55 is pushed downwardly and the prongs 51 and 53 enter the corresponding holes 57 and 58. When entering the holes, the forward prong 51 pushed down the pin head 61 located inside the forward hole 57 and liberates it from its retaining position. At this moment the horizontal spring 69 automatically push the second element 41, by means of front wall 45, towards the socket head 13 and provide the overhanging of the flange 47 of the second element and of the finger member 73 of the switch over the flange 37 of the socket head, thus making impossible for the socket head to come out of the ball element 1 (FIG. 1 and 2). Pin head 61 comes therefore to be lodged in rearward hole 58.

To move away the second element from the socket head (arrow B, FIG. 6), the plunger 55 is again pushed downwardly (arrow A FIG. 5), and this time the rearward prong 53 pushes down the pin head 61 positioned inside the rearward hole 58 (FIG. 5) and makes it to come out of its retaining position. The second element 41 is then gripped by the hand of the operator, at the level of the cover member, or by any handle means (not shown) and is displaced away (arrow B, FIG. 5 and 6) from the socket head until the pin head 61 enters again the forward hole 57 and retains the second element in this retracted position.

Therefore by pushing down the plunger 55, the second element may be manually displaced away from the socket head to an unlocking position, and automatically displaced towards the socket head to a locking position.

If the bolt 21 is broken as shown in FIG. 2, the flange 37 of the socket head 13 comes into contact with the finger member of the switch and the electrical warning device is actuated thus warning the conductor of the towing vehicle of the defect. The socket member 11 cannot come out of the ball member 1 because it is retained by the flange 47 of the second element of the locking device.

The finger member 73 is placed near the flange 47 of the second element and adjacent thereto (FIG. 7) in such a way that in case of a defect happening to the socket member, the flange 37 of this socket member comes into contact first with the finger member 73 and then with the flange 47 of the second element. But, due to the flexibility of finger member 73 which bends towards flange 47, flange 37 remains in contact with the finger member 73 and flange 47 (FIG. 4) during all the time of the defect.

It will be evident from the description of the illustrated embodiment that variations are possible with respect to the component parts of the inventive device, while preserving the principal features of this invention.

We claim:

1. A safety locking device for a trailer hitch assembly, the hitch assembly comprising a ball member fixed to an attachment plate connected to the rear of a towing vehicle, and a socket member connected to the towed vehicle, the socket member having a socket head adapted to be coupled with the ball member, the socket head being provided with a flange disposed around the periphery of its opening, the locking device comprising:
   a. a first element fixed to said attachment plate;
   b. a second element fit to said first element and horizontally displaceable with respect to said first element, said second element having a flange facing said socket head, said flange overhanging the flange of said socket head when the locking device is in its locking position;
   c. a plunger protruding from said second element, said plunger being provided with a fork member having two prongs, said prongs being positioned above two corresponding holes provided on top of said second element;
   d. a stud means positioned inside a vertical cavity in said first element and provided with a pin head coming out of one of said holes under the downwardly pushing action of one of said prongs and after being displaced entering the second hole under the influence of a spring located inside said vertical cavity provided in said first element, said pin head when inside one of said holes providing the firm connection of said second element with said first element, and when out of one of said holes providing the disconnection of said first and second elements;
   e. resilient means for providing the displacement of said second element towards said socket head when said stud means is in such a position as to provide the disconnection of said second element from said first element, and
   f. manual means for providing the displacement of said second element away from said socket head when said stud means is again in such a position as to provide the disconnection of said second element from said first element.

2. A safety locking device according to claim 1, further comprising:
   a switch forming part of a warning device, said switch being removably connected to said second element and being displaceable with said second element, said switch having a finger member positioned slightly below said flange of the second element, said finger member overhanging said flange of the socket head when the locking device is in its locking position;
   when the locking device is in its locking position and when the socket head is loosened from the ball member, said flange of said socket head coming into contact with said finger member and also with said flange of said second element, said contact with said finger member operating the warning device and said contact with said flange of said second element preventing the complete disengagement of said socket member from said ball member.

3. A safety device according to claim 1, wherein said manual means is formed by a cover located on the rear part of the top of said second element and forming an integral part thereof, said cover enclosing the prongs of the plunger and forming a support for facilitating the gripping of said second element and displacing it away from said socket head.

4. A safety device according to claim 1, wherein said resilient means for providing the displacement of said second element towards said socket head comprises two springs located inside horizontal lateral openings provided in said first element, one of the ends of said springs abuting against a front wall of said second element.

5. A safety device according to claim 1, wherein said resilient means for providing the displacement of said second element towards said socket head comprises a spring located inside a horizontal central opening provided in said first element, one end of said spring abuting against a front wall of said second element.

6. A safety locking device according to claim 2, wherein said finger member is flexible.

* * * * *